US007751211B2

(12) United States Patent
Yuzurihara et al.

(10) Patent No.: US 7,751,211 B2
(45) Date of Patent: Jul. 6, 2010

(54) INSTANTANEOUS VOLTAGE-DROP COMPENSATION CIRCUIT, POWER CONVERSION APPARATUS, INSTANTANEOUS VOLTAGE-DROP COMPENSATION METHOD AND COMPUTER READABLE MEDIUM STORING INSTANTANEOUS VOLTAGE-DROP COMPENSATION PROGRAM

(75) Inventors: Itsuo Yuzurihara, Zama (JP); Atsushi Takayanagi, Kamakura (JP); Ryuichi Takamura, Yokohama (JP)

(73) Assignee: Kyosan Electric Mfg. Co., Ltd., Yokohama-Shi (JP)

( * ) Notice: Subject to any disclaimer, the term of this patent is extended or adjusted under 35 U.S.C. 154(b) by 604 days.

(21) Appl. No.: 11/717,137

(22) Filed: Mar. 13, 2007

(65) Prior Publication Data
US 2008/0130335 A1 Jun. 5, 2008

(30) Foreign Application Priority Data
Dec. 4, 2006 (JP) ............................. 2006-326912

(51) Int. Cl.
*H02M 7/217* (2006.01)
(52) U.S. Cl. ............................. 363/127; 363/77; 363/89
(58) Field of Classification Search ................... 363/37, 363/74, 76, 77, 79, 84, 89, 90, 125, 127
See application file for complete search history.

(56) References Cited

U.S. PATENT DOCUMENTS 5,003,242 A * 3/1991 Liber .......................... 318/778
6,043,999 A * 3/2000 Ehrenberg et al. ............ 363/89
6,052,297 A * 4/2000 Akamatsu et al. ............. 363/84
6,437,997 B1 * 8/2002 Inarida et al. ................. 363/37
6,459,599 B1 * 10/2002 Agirman et al. ............... 363/84
6,507,505 B2 * 1/2003 Oka et al. ..................... 363/47
6,567,282 B1 * 5/2003 Kikuchi et al. ................ 363/37
6,594,164 B2 * 7/2003 Suzuki ......................... 363/69
7,301,736 B2 * 11/2007 Schierling .................... 361/23
7,336,509 B2 * 2/2008 Tallam ........................ 363/81
2005/0207192 A1 * 9/2005 Fu et al. ....................... 363/89

FOREIGN PATENT DOCUMENTS

JP    A 2004-222447    8/2004

* cited by examiner

*Primary Examiner*—Adolf Berhane
*Assistant Examiner*—Matthew Grubb
(74) *Attorney, Agent, or Firm*—Oliff & Berridge, PLC

(57) ABSTRACT

An instantaneous voltage-drop compensation circuit including: a first voltage detector detecting three-phase voltages to be input to a power converter converting three-phase AC to DC based on control pulse signals, and outputting three-phase voltage signals; a first three-phase to two-phase converter converting the detected signals to two-phase voltage signals; a first current detector detecting three-phase currents to be input to the power converter and outputting three-phase current signals; a second three-phase to two-phase converter converting the detected current signals to two-phase current signals; a first subtracter generating a first deviation signal from input current command signals and the two-phase current signals; an input current controller generating input current control signals based on the first deviation signal; and a first adder adding the two-phase voltage signals to the input current control signals, to generate control pulse signals for the power converter.

16 Claims, 7 Drawing Sheets

INSTANTANEOUS VOLTAGE-DROP COMPENSATION CIRCUIT, POWER CONVERSION APPARATUS, INSTANTANEOUS VOLTAGE-DROP COMPENSATION METHOD AND COMPUTER READABLE MEDIUM STORING INSTANTANEOUS VOLTAGE-DROP COMPENSATION PROGRAM

BACKGROUND OF THE INVENTION

1. Field of the Invention

The present invention relates to an instantaneous voltage-drop compensation circuit, a power conversion apparatus, an instantaneous voltage-drop compensation method and a computer readable medium storing an instantaneous voltage-drop compensation program.

2. Description of the Related Art

There has been commonly used an (AC-DC) power conversion apparatus which converts three-phase alternating current (AC) power to direct current (DC) power. In this power conversion apparatus, there has been also used an instantaneous voltage-drop compensation apparatus which can maintain power supply to a load, particularly when three-phase AC input voltage fails or drops instantaneously (see, for example, Patent Document 1: JP 2004-222447A).

FIG. 9 shows a configuration of a conventional power conversion system 1ζ. As shown in FIG. 9, the power conversion system 1ζ includes a three-phase AC power source 1, a power conversion apparatus 100B and a DC load 9. The power conversion apparatus 100B includes a rectifier 4A which converts the three-phase AC power outputted from the three-phase AC power source 1 to DC power to supply it to the DC load 9, and a condenser unit 8B which is a power storage device as an instantaneous voltage-drop compensation apparatus connected between the rectifier 4A and the DC load 9. A secondary battery has been also used as the power storage device.

In the power conversion apparatus 100B, the rectifier 4A converts the three-phase AC to the DC power in normal operation. In this operation, the condenser unit 8B is charged. When instantaneous voltage failure or drop occurs, the charged power is discharged from the condenser unit 8B to thereby maintain constant output voltage and keep supplying power to the DC load 9.

Three-phase AC is generally connected not only to three-phase equal loads but also to various single-phase loads, however, voltage drops have sometimes occurred in three-phase balanced or unbalanced states under various influences from turn-on of a load, weather, accidental phenomena, or the like.

In the configuration using the power storage device, such as a condenser or a secondary battery, as in the conventional power conversion apparatus 100B, the power storage device requires a large equipment and makes its cost higher. Further, the power storage device has required measures for deterioration with time, had comparatively short apparatus life, and made maintenance load larger.

Accordingly, there was a demand for stable power supply even when instantaneous voltage drop occurs by means of conversion of three-phase AC input power without using such a power storage device. There was also a demand for achieving power factor correction without using the power storage device.

SUMMARY OF THE INVENTION

An object of the invention is to carry out instantaneous voltage-drop compensation with conversion of AC input power itself.

In order to solve the above-described problem, in accordance with a first aspect of the invention, the instantaneous voltage-drop compensation circuit includes:

a first voltage detector which detects three-phase voltages to be input to a power converter and outputs three-phase voltage signals, the converter converting three-phase alternating current to direct current, based on control pulse signals;

a first three-phase to two-phase converter which converts the detected three-phase voltage signals to two-phase voltage signals;

a first current detector which detects three-phase currents to be input to the power converter and outputs three-phase current signals;

a second three-phase to two-phase converter which converts the detected three-phase current signals to two-phase current signals;

a first subtracter which generates a first deviation signal from input current command signals and the two-phase current signals;

an input current controller which generates input current control signals based on the first deviation signal;

a first adder which adds the two-phase voltage signals to the input current control signals;

a first two-phase to three-phase converter which converts input current control signals, to which the two-phase voltage signals have been added, to three-phase control signals; and a control pulse signal generator which generates the control pulse signals for the power converter based on the three-phase control signals and outputs the control pulse signals to the power converter.

According to the invention, the instantaneous voltage-drop compensation can be achieved by converting AC input power itself. This allows the structure for the instantaneous voltage-drop compensation to be smaller with longer life at lower cost, and also allows easier maintenance of the system. Further, this compensation improves the power factor, allowing harmonics suppression with the power factor correction.

Preferably, the instantaneous voltage-drop compensation circuit further includes:

a positive-phase negative-phase separator which separates the converted two-phase voltage signals into positive-phase components and negative-phase components;

a second two-phase to three-phase converter which converts the separated negative-phase components of the two-phase voltage signals to negative-phase components of the three-phase voltage signals;

a zero-phase voltage extractor which extracts a zero-phase voltage signal from the detected three-phase voltage signals; and a second adder which adds the negative-phase components of the three-phase voltage signals and the zero-phase voltage signal to the three-phase control signals, wherein the first adder adds the separated positive-phase components of the two-phase voltage signals to the input current control signals, and the control pulse signal generator generates the control pulse signals based on three-phase control signals resulted from the sum of the negative-phase components of the three-phase voltage signals and the zero-phase voltage signal.

Preferably, the instantaneous voltage-drop compensation circuit further includes:

a second voltage detector which detects a DC voltage output from the power converter and outputs a DC voltage signal;

a second subtracter which generates a second deviation signal from a voltage commanding value signal and the DC voltage signal;

a DC voltage controller which generates a DC voltage control signal based on the second deviation signal; and an input current command converter which generates the input current command signals based on the DC voltage control signal and the positive-phase components of the two-phase voltage signals.

According to the compensation circuit having such a configuration, response of the input current command signal to the fluctuation of AC input voltage can be made speedier. This allows suppression of transient change of the DC output voltage.

The instantaneous voltage-drop compensation circuit, preferably, further includes:

a second current detector which detects a DC current output from the power converter and outputs a DC current signal;

a multiplier which multiplies the DC voltage signal by the DC current signal and outputs a DC power signal; and a third adder which adds the DC power signal to the DC voltage control signal, wherein the input current command converter generates the input current command signals based on DC voltage control signal to which the DC power signal has been added, and the positive-phase components of the two-phase voltage signals.

According to the compensation circuit having such a configuration, response to the load change of the load to which the DC output power is output can be made speedier. This allows suppression of transient change of the DC output voltage.

Preferably, the instantaneous voltage-drop compensation circuit further includes:

a phase voltage extractor which extracts a phase voltage signal from the three-phase voltage signals; and a synchronous signal generator which generates and outputs a synchronous signal from the extracted phase voltage signal, wherein the first three-phase to two-phase converter, the second three-phase to two-phase converter, the first two-phase to three-phase converter and the second two-phase to three-phase converter operate in synchronism with the synchronous signal.

According to the compensation circuit having such a configuration, three-phase to two-phase conversion and two-phase to three-phase conversion can be always performed in synchronism with the phase of AC input voltage. This allows maintaining the power factor of 1 irrespective of occurrence of the instantaneous voltage drop.

Preferably, the first voltage detector includes:

a line voltage detector which detects three-phase line voltages to be input to the power converter and outputs three-phase line voltage signals; and a line-to-line phase voltage converter which converts the detected three-phase line voltage signals to three phase voltage signals.

According to the compensation circuit having such a configuration, instantaneous voltage-drop compensation can be performed irrespective of adopting a three-phase three-wire system or a three-phase four-wire system for the AC system of the three-phase AC input power source.

In accordance with a second aspect of the invention, the power conversion apparatus includes:

the power converter; and the instantaneous voltage-drop compensation circuit according to the first aspect of the invention.

According to the second aspect of the invention, the instantaneous voltage-drop compensation can be achieved by converting AC input power itself. This allows the structure for the instantaneous voltage-drop compensation to be smaller with longer life at lower cost, and also allows easier maintenance of the system. Further, this compensation improves the power factor, allowing harmonics suppression with the power factor correction.

In accordance with a third aspect of the invention, the instantaneous voltage-drop compensation method includes:

a first voltage detecting step to detect three-phase voltages to be input to a power converter and to output three-phase voltage signals, the converter converting three-phase alternating current to direct current, based on control pulse signals;

a first three-phase to two-phase converting step to convert the detected three-phase voltage signals to two-phase voltage signals;

a first current detecting step to detect three-phase currents to be input to the power converter and to output three-phase current signals;

a second three-phase to two-phase converting step to convert the detected three-phase current signals to two-phase current signals;

a first subtracting step to generate a first deviation signal from input current command signals and the two-phase current signals;

an input current controlling step to generate input current control signals based on the first deviation signal;

a first adding step to add the two-phase voltage signals to the input current control signals;

a first two-phase to three-phase converting step to convert input current control signals to which the two-phase voltage signals have been added, to three-phase control signals; and a control pulse signal generating step to generate the control pulse signals for the power converter based on the three-phase control signals and to output the control pulse signals to the power converter.

According to the third aspect of the invention, the instantaneous voltage-drop compensation can be achieved by converting AC input power itself. This allows the structure for the instantaneous voltage-drop compensation to be smaller with longer life at lower cost, and also allows easier maintenance of the system. Further, this compensation improves the power factor, allowing harmonics suppression with the power factor correction.

In the third aspect of the invention, preferably, the method further includes:

a positive-phase negative-phase separating step to separate the converted two-phase voltage signals into positive-phase components and negative-phase components;

a second two-phase to three-phase converting step to convert the separated negative-phase components of the two-phase voltage signals to negative-phase components of the three-phase voltage signals;

a zero-phase voltage extracting step to extract a zero-phase voltage signal from the detected three-phase voltage signals; and a second adding step to add the negative-phase components of the three-phase voltage signals and the zero-phase voltage signal to the three-phase control signals, wherein in the first adding step, the separated positive-phase components of the two-phase voltage signals are added to the input current control signals, and in the control pulse signal generating step, the control pulse signals are generated based on three-phase control signals resulted from the sum of the negative-phase components of the three-phase voltage signals and the zero-phase voltage signal.

Preferably, the method further includes:

a second voltage detecting step to detect a DC voltage output from the power converter and to output a DC voltage signal;

a second subtracting step to generate a second deviation signal from a voltage commanding value signal and the DC voltage signal;

a DC voltage control step to generate a DC voltage control signal based on the second deviation signal; and an input current command converting step to generate the input current command signals based on the DC voltage control signal and the positive-phase components of the two-phase voltage signals.

Preferably, the method further includes:

a second current detecting step to detect a DC current output from the power converter and to output a DC current signal;

a multiplying step to multiply the DC voltage signal by the DC current signal and to output a DC power signal; and a third adding step to add the DC power signal to the DC voltage control signal, wherein in the input current command converting step, the input current command signals are generated based on DC voltage control signal to which the DC power signal has been added, and the positive-phase components of the two-phase voltage signals.

Preferably, the method further includes:

a phase voltage extracting step to extract a phase voltage signal from the three-phase voltage signals; and a synchronous signal generating step to generate and output a synchronous signal from the extracted phase voltage signal, wherein the first three-phase to two-phase converting step, the second three-phase to two-phase converting step, the first two-phase to three-phase converting step and the second two-phase to three-phase converting step are performed in synchronism with the synchronous signal.

In the method, preferably, the first voltage detecting step includes:

a line voltage detecting step to detect three-phase line voltages to be input to the power converter and to output three-phase line voltage signals; and a line-to-line phase voltage converting step to convert the detected three-phase line voltage signals to three phase voltage signals.

In accordance with a fourth aspect of the invention, the computer readable medium stores a program for making a computer function as:

a first voltage detector which detects three-phase voltages to be input to a power converter and outputs three-phase voltage signals, the converter converting three-phase alternating current to direct current, based on control pulse signals;

a first three-phase to two-phase converter which converts the detected three-phase voltage signals to two-phase voltage signals;

a first current detector which detects three-phase currents to be input to the power converter and outputs three-phase current signals;

a second three-phase to two-phase converter which converts the detected three-phase current signals to two-phase current signals;

a first subtracter which generates a first deviation signal from input current command signals and the two-phase current signals;

an input current controller which generates input current control signals based on the first deviation signal;

a first adder which adds the two-phase voltage signals to the input current control signals;

a first two-phase to three-phase converter which converts input current control signals, to which the two-phase voltage signals have been added, to three-phase control signals; and a control pulse signal generator which generates the control pulse signals for the power converter based on the three-phase control signals and outputs the control pulse signals to the power converter.

According to the fourth aspect of the invention, the instantaneous voltage-drop compensation can be achieved by converting AC input power itself. This allows the structure for the instantaneous voltage-drop compensation to be smaller with longer life at lower cost, and also allows easier maintenance of the system. Further, this compensation improves the power factor, allowing harmonics suppression with the power factor correction.

Preferably, in the computer readable medium, the program further makes the computer function as:

a positive-phase negative-phase separator which separates the converted two-phase voltage signals into positive-phase components and negative-phase components;

a second two-phase to three-phase converter which converts the separated negative-phase components of the two-phase voltage signals to negative-phase components of the three-phase voltage signals;

a zero-phase voltage extractor which extracts a zero-phase voltage signal from the detected three-phase voltage signals; and a second adder which adds the negative-phase components of the three-phase voltage signals and the zero-phase voltage signal to the three-phase control signals, wherein the first adder adds the separated positive-phase components of the two-phase voltage signals to the input current control signals, and the control pulse signal generator generates the control pulse signals based on three-phase control signals resulted from the sum of the negative-phase components of the three-phase voltage signals and the zero-phase voltage signal.

Preferably, in the computer readable medium, the program further makes the computer function as:

a second voltage detector which detects a DC voltage output from the power converter and outputs a DC voltage signal;

a second subtracter which generates a second deviation signal from a voltage commanding value signal and the DC voltage signal;

a DC voltage controller which generates a DC voltage control signal based on the second deviation signal; and an input current command converter which generates the input current command signals based on the DC voltage control signal and the positive-phase components of the two-phase voltage signals.

Preferably, in the computer readable medium, the program further makes the computer function as:

a second current detector which detects a DC current output from the power converter and outputs a DC current signal;

a multiplier which multiplies the DC voltage signal by the DC current signal and outputs a DC power signal; and a third adder which adds the DC power signal to the DC voltage control signal, wherein the input current command converter generates the input current command signals based on DC voltage control signal to which the DC power signal has been added, and the positive-phase components of the two-phase voltage signals.

Preferably, in the computer readable medium, the program further makes the computer function as:

a phase voltage extractor which extracts a phase voltage signal from the three-phase voltage signals; and a synchronous signal generator which generates and outputs a synchronous signal from the extracted phase voltage signal, wherein the first three-phase to two-phase converter, the second three-phase to two-phase converter, the first two-phase to three-phase converter and the second two-phase to three-phase converter operate in synchronism with the synchronous signal.

Preferably, in the computer readable medium, the first voltage detector includes:

a line voltage detector which detects three-phase line voltages to be input to the power converter and outputs three-phase line voltage signals; and a line-to-line phase voltage converter which converts the detected three-phase line voltage signals to three phase voltage signals.

BRIEF DESCRIPTION OF THE DRAWINGS

The present invention will become more fully understood from the detailed description given hereinafter and the accompanying drawings which are given by way of illustration only, and thus are not intended as a definition of the limits of the scope of the invention, and wherein.

DETAILED DESCRIPTION OF THE PREFERRED EMBODIMENT

Hereinafter, the first embodiment, the first to fourth modifications and the second embodiment will be described with reference to the drawings. The scope of the invention is not limited to the exemplary drawings.

First Embodiment

Figure 1:
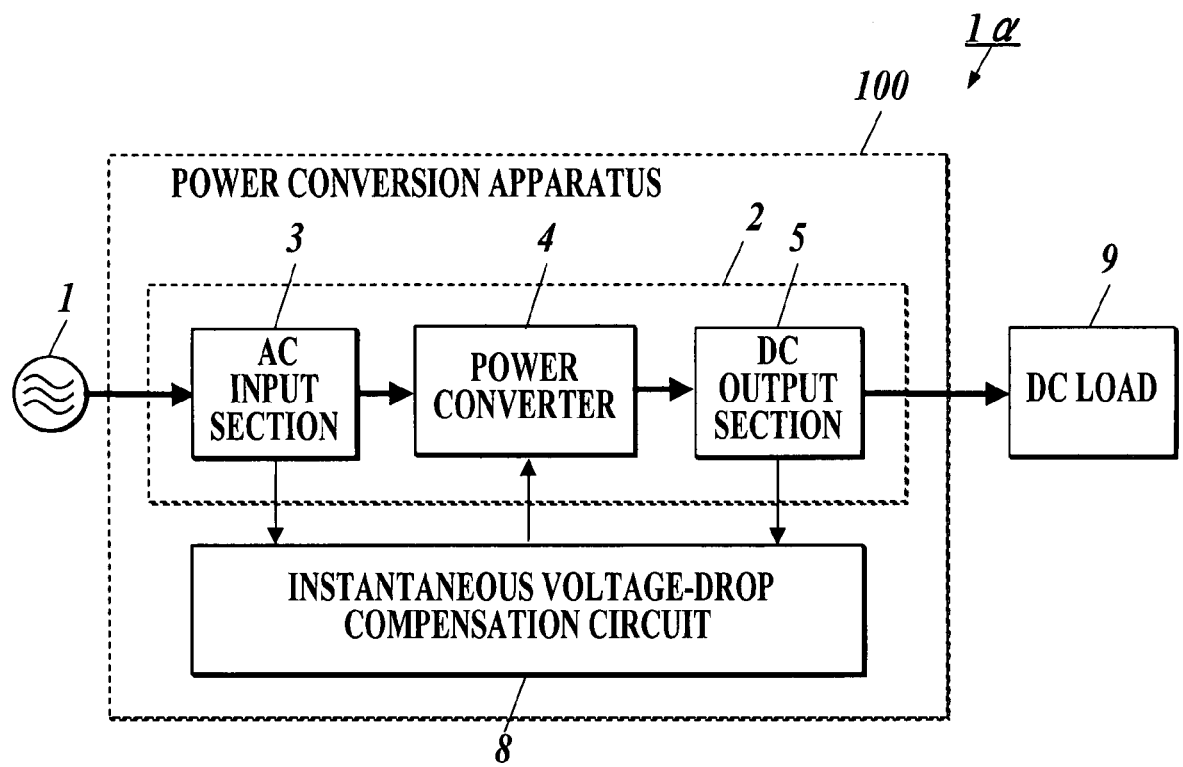
FIG. 1 is a view showing a configuration of a power conversion system 1α according to a first embodiment of the invention.

The first embodiment according to the invention will be described with reference to FIGS. 1 to 3. FIG. 1 shows a configuration of a power conversion system 1α of the present embodiment.

Figure 2:
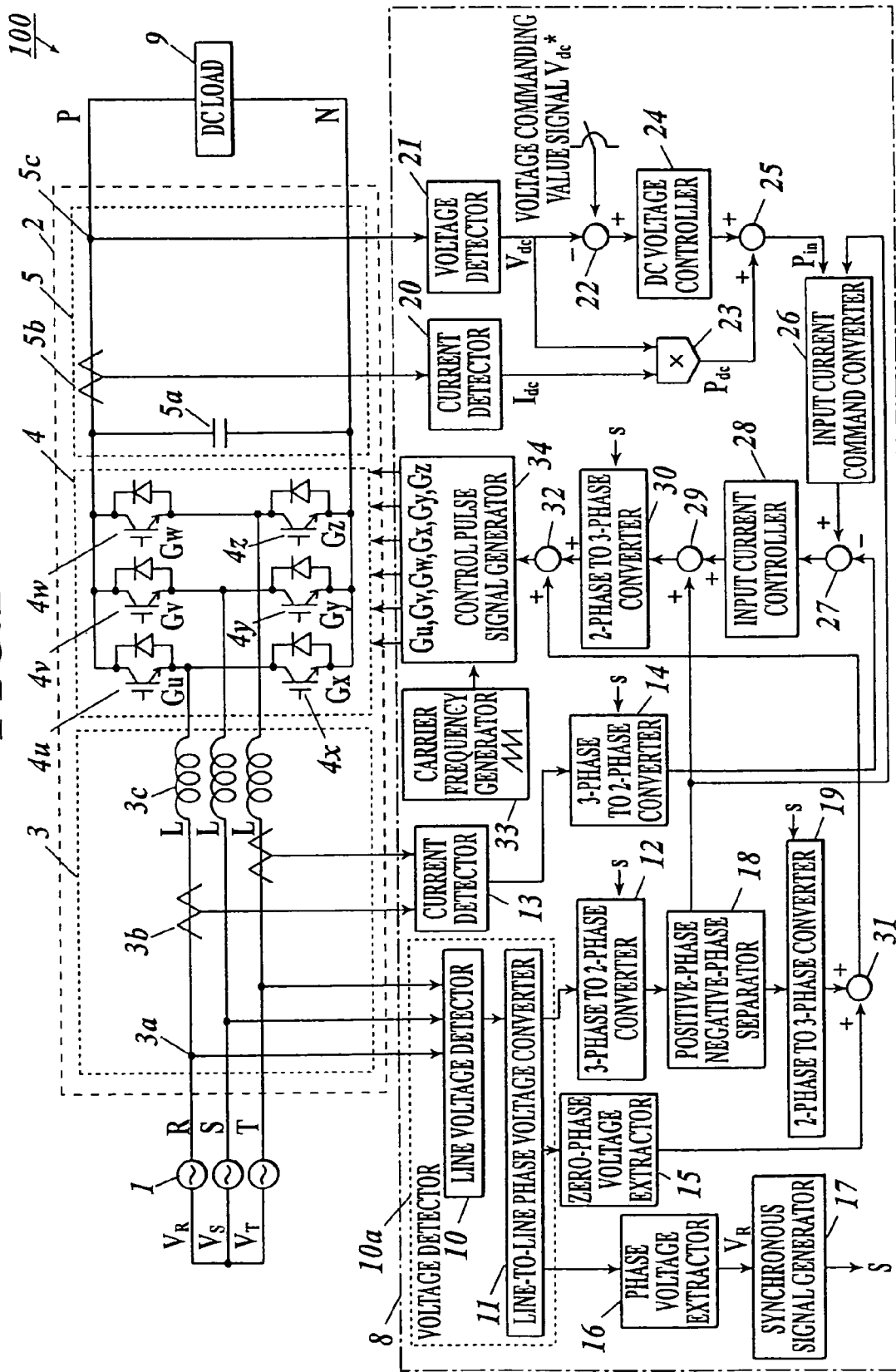
FIG. 2 is a view showing a detailed structure of a power conversion apparatus 100.

Referring first to FIGS. 1 and 2, the structure of an apparatus of the embodiment will be described. As shown in FIG. 1, the power conversion system 1α includes a three-phase AC power source 1, a power conversion apparatus 100, and a DC load 9.

The three-phase AC power source 1 is three-phase AC input power source alternating with an angular frequency ω. The DC load 9 is a load for direct current. The power conversion apparatus 100 includes a main circuit section 2, and an instantaneous voltage-drop compensation circuit 8. The main circuit section 2 is a circuit that converts the three-phase AC power input from the AC power source 1 into DC power. The main circuit section 2 includes an AC input section 3, a power converter 4, and a DC output section 5.

The AC input section 3 receives the three-phase AC power from the AC power source 1 and outputs to the power converter 4. The power converter 4 converts the three-phase AC power input from the AC input section 3 into DC power. The DC output section 5 output the DC power converted by the power converter 4 to the DC load 9. The instantaneous voltage-drop compensation circuit 8 compensates the DC output voltage of the power converter 4 when instantaneous voltage drop occurs in the power converter 4.

FIG. 2 shows a detailed structure of the power conversion apparatus 100. As shown in FIG. 2, the three-phase AC power source 1 outputs three-phase input power having voltages $V_R$, $V_S$ and $V_T$. The voltages $V_R$, $V_S$ and $V_T$ are phase voltages of R-phase, S-phase and T-phase, respectively. The AC input section 3 includes connections 3a, sensors 3b, and AC reactors 3c.

The connections 3a have respective connections with wires for R-phase, S-phase and T-phase. The sensors 3b are current sensors that detect AC input current input from the three-phase AC power source 1, and provided on the wires for R-phase and T-phase. The AC reactors 3c are provided on the wires for R-phase, S-phase and T-phase, and prevent high-frequency current from passing.

The power converter 4 has transistors, such as IGBTs, 4u, 4v, 4w, 4x, 4y and 4z. Each of the transistors 4u, 4v, 4w, 4x, 4y and 4z has a diode. With control of turning on/off each gate of the transistors 4u, 4v, 4w, 4x, 4y and 4z, the input three-phase AC power is converted to DC power and output.

The DC output section 5 includes a condenser 5a, a sensor 5b, and a connection 5c. The condenser 5a smoothes the DC voltage output from the power converter 4. The sensor 5b is a current sensor that detects the DC output current output from the power converter 4. The connection 5c is connected with the line of the DC output from the power converter 4.

The instantaneous voltage-drop compensation circuit 8 includes voltage detector 10a, three-phase to two-phase converter 12, current detector 13, three-phase to two-phase converter 14, zero-phase voltage extractor 15, phase voltage extractor 16, synchronous signal generator 17, positive-phase negative-phase separator 18, two-phase to three-phase converter 19, current detector 20, voltage detector 21, subtracter 22, multiplier 23, DC voltage controller 24, adder 25, input current command converter 26, subtracter 27, input current controller 28, adder 29, two-phase to three-phase converter 30, adders 31 and 32, carrier frequency generator 33, and control pulse signal generator 34.

The voltage detector 10a includes a line voltage detector 10 and a line-to-line phase voltage converter 11. The line voltage detector 10 detects line-to-line voltages of three-phase AC input voltage at connections 3a, and outputs line voltage signals. The line-to-line phase voltage converter 11 converts the line voltage signals, detected by the line voltage detector 10, into phase voltage signals $V_R{'}$, $V_S{'}$ and $V_T{'}$, and generates a zero-phase voltage signal $V_0$ and phase voltage signals $V_R$, $V_S$ and $V_T$. The three-phase to two-phase converter 12 converts the phase voltage signals $V_R{'}$, $V_S{'}$ and $V_T{'}$, detected by the line-to-line phase voltage converter 11, into (two-phase) voltage signals $V_d$ and $V_q$ of d-axis and q-axis, respectively.

The current detector 13 obtains detected signals of AC input currents of R-phase and T-phase, and generates three-phase AC input current signals $i_R$, $i_S$, and $i_T$. The current detector 13 utilizes a characteristic that the sum total of AC input currents of R-phase, S-phase and T-phase is zero, and generate the three-phase AC input current signals. Therefore, if a structure is provided that at least two AC input currents out of R-phase's, S-phase's and T-phase's are detected, input currents for three phases can be obtained.

The three-phase to two-phase converter 14 converts three-phase AC input currents $i_R$, $i_S$ and $i_T$ into current signals $i_d$ and $i_q$ of d-axis and q-axis, respectively. The zero-phase voltage extractor 15 extracts a zero-phase voltage signal $V_0$ from the signals converted by the line-to-line phase voltage converter 11.

The phase voltage extractor 16 extracts an R-phase voltage signal $V_R$ from phase voltage signals $V_R{'}$, $V_S{'}$ and $V_T{'}$ converted by the line-to-line phase voltage converter 11. The synchronous signal generator 17 generates a synchronous signal s of AC voltage from the R-phase voltage signal extracted by the phase voltage extractor 16, and outputs it to the three-phase to two-phase converters 12 and 14 and the two-phase to three-phase converters 19 and 30. Alternatively, the phase voltage extractor 16 may extract an S-phase voltage signal $V_S$ or a T-phase voltage signal $V_T$, and the synchronous signal generator 17 may generate a synchronous signal s from the S-phase voltage signal $V_S$ or the T-phase voltage signal $V_T$ extracted by the phase voltage extractor 16. The three-phase to two-phase converters 12 and 14 and the two-phase to three-phase converters 19 and 30 synchronize with the synchronous signal s input from the synchronous signal generator 17 to execute respective signal processing.

The positive-phase negative-phase separator 18 separates the voltage signals $V_d$ and $V_q$ of d-axis and q-axis, converted by the three-phase to two-phase converters 12, to positive-phase components $V_{dp}$ and $V_{qp}$ and negative-phase components $V_{dn}$ and $V_{qn}$. The two-phase to three-phase converters 19 converts the negative-phase components of d-axis and q-axis $V_{dn}$ and $V_{qn}$, separated by the positive-phase negative-phase separator 18, to phase voltage signals $V_{Rn}$, $V_{Sn}$ and $V_{Tn}$ as negative-phase components of voltage signals for three phases.

The current detector 20 obtains a detected signal of the DC output current detected by the sensor 5b, and generates a DC output current signal $I_{dc}$. The voltage detector 21 detects the DC output voltage at the connection 5c, and generates a DC output voltage signal $V_{dc}$. The subtracter 22 subtracts the DC output voltage signal $V_{dc}$, detected by the voltage detector 21, from a DC voltage commanding value signal $V_{dc}{*}$ that indicates a constant voltage value set as a voltage commanding value, and outputs a deviation signal. The multiplier 23 multiplies the DC output current signal $I_{dc}$ detected by the current detector 20, and the DC output voltage signal $V_{dc}$ detected by the voltage detector 21, to calculate an instantaneous power signal $P_{dc}$.

The DC voltage controller 24 generates a DC voltage control signal from the deviation signal calculated by the subtracter 22 as a result of PI (proportional integral) control to control the DC output voltage signal $V_{dc}$ to a constant voltage value. The adder 25 adds the instantaneous power signal $P_{dc}$, calculated by the multiplier 23, and the DC voltage control signal generated by the DC voltage controller 24, and generates an effective power signal $P_{in}$. The input current command converter 26 calculates and outputs input current command signals based on the effective power signal $P_{in}$, calculated by the adder 25, and the positive-phase components of the voltage signals of d-axis and q-axis separated by the positive-phase negative-phase separator 18.

The subtracter 27 subtracts the current signals of d-axis and q-axis, converted by the three-phase to two-phase converters 14, from the input current command signals calculated by the input current command converter 26, and outputs deviation signals. The input current controller 28 generates input current control signals based on the deviation signals calculated by the subtracter 27 as a result of PI control to control the input current to a constant current value.

The adder 29 adds the input current control signals, generated by the input current controller 28, and the positive-phase components $V_{dp}$ and $V_{qp}$ of voltage signals of d-axis and q-axis, separated by the positive-phase negative-phase separator 18, and outputs control signals $C_d$ and $C_q$ of d-axis and q-axis. The two-phase to three-phase converter 30 converts the control signals $C_d$ and $C_q$ of d-axis and q-axis, calculated by the adder 29, to control signals $C_u$, $C_v$, and $C_w$ for three phases.

The adder 31 adds the zero-phase voltage signal $V_0$, which is a phase voltage signal extracted from the zero-phase voltage extractor 15, and the negative-phase components $V_{Rn}$, $V_{Sn}$, and $V_{Tn}$, which are voltage signals for three phases converted by the two-phase to three-phase converters 19, and outputs added signals. The adder 32 adds the control signals $C_u$, $C_v$ and $C_w$ for three phases, converted by the two-phase to three-phase converter 30, and the added signals calculated by the adder 31, and outputs gate control signals $G_u{'}$, $G_v{'}$ and $G_w{'}$.

The carrier frequency generator 33 generates and outputs a triangular wave signal as a carrier frequency. The control pulse signal generator 34 compares the gate control signals $G_u{'}$, $G_v{'}$ and $G_w{'}$ calculated by the adder 32 with the triangular wave signal generated by the carrier frequency generator 33 to generate gate pulse signals Gu, Gv, Gw, Gx, Gy and Gz as PWM signals, and outputs to the respective gates of the transistors 4u, 4v, 4w, 4x, 4y and 4z.

Next, operations of the power conversion apparatus 100 will be explained. Initially, the phase voltages $V_R$, $V_S$ and $V_T$ can be represented as shown in the following expression (1) using components of positive phase voltage signal $V_p$, negative phase voltage signal $V_n$ and zero phase voltage signal $V_0$ according to a method of symmetrical coordinates.

$$\begin{bmatrix} v_R \\ v_S \\ v_T \end{bmatrix} = \begin{bmatrix} 1 & 1 & 1 \\ 1 & a^2 & a \\ 1 & a & a^2 \end{bmatrix} \begin{bmatrix} v_0 \\ v_p \\ v_n \end{bmatrix} \quad (1)$$

wherein

-continued $$\begin{bmatrix} v_0 \\ v_p \\ v_n \end{bmatrix} = \begin{bmatrix} V_0 \cdot e^{j(\theta+\alpha_0)} \\ V_p \cdot e^{j(\theta+\alpha_p)} \\ V_n \cdot e^{j(\theta+\alpha_n)} \end{bmatrix}, a = e^{j\frac{2}{3}\pi}$$

where $\theta=\omega t$, $\omega$: angular frequency, t: time, $\alpha_0$: phase angle of zero-phase voltage, $\alpha_p$: phase angle of positive phase voltage, and $\alpha_n$: phase angle of negative phase voltage.

The line voltage detector 10 detects AC voltages of the three-phase AC power source 1 from the connections 3$a$ as line voltage signals $V_{RS}$, $V_{ST}$ and $V_{TR}$. The line-to-line phase voltage converter 11 converts the line voltage signals $V_{RS}$, $V_{ST}$ and $V_{TR}$ to the phase voltage signals $V_R'$, $V_S'$ and $V_T'$ shown in the following expression (2):

$$\left.\begin{aligned} v_R' &= \frac{1}{3}(v_{RS} - v_{TR}) \\ v_S' &= \frac{1}{3}(v_{ST} - v_{RS}) \\ v_T' &= \frac{1}{3}(v_{TR} - v_{ST}) \end{aligned}\right\} \quad (2)$$

The phase voltage signals $V_R'$, $V_S'$ and $V_T'$ can be represented as shown in the following expression (3), and it is understood that the expression (3) does not include the zero-phase voltage signal $V_0$ compared with the expression (1).

$$\begin{bmatrix} v_R' \\ v_S' \\ v_T' \end{bmatrix} = \begin{bmatrix} 1 & 1 \\ a^2 & a \\ a & a^2 \end{bmatrix} \begin{bmatrix} v_p \\ v_n \end{bmatrix} \quad (3)$$

In other words, if the zero-phase voltage signal $V_0$ is found, the phase voltages $V_R$, $V_S$ and $V_T$ generated from the three-phase AC power source 1 can be obtained. The zero-phase voltage signal $V_0$ is generated by the line-to-line phase voltage converter 11 as a value given by the following expression (4). Therefore, the expression (3) and the expression (4) are added to obtain the expression (1).

$$v_0 = k1 \cdot v_R' + k2 \cdot v_S' + k3 \cdot v_T' \quad (4)$$

In the above expression, k1, k2 and k3 are coefficients determined by $V_R'$, $V_S'$ and $V_T'$.

To be more concrete, the line-to-line phase voltage converter 11 detects peak values of the phase voltage signals $V_R'$, $V_S'$ and $V_T'$, and calculates the coefficients k1, k2 and k3 based on these three peak values. The line-to-line phase voltage converter 11 generates the zero-phase voltage signal $V_0$ based on the coefficients k1, k2 and k3. The line-to-line phase voltage converter 11 also generates the phase voltages $V_R$, $V_S$ and $V_T$ based on the phase voltage signals $V_R'$, $V_S'$ and $V_T'$ and the zero-phase voltage signal $V_0$. The zero-phase voltage extractor 15 extracts the zero-phase voltage signal $V_0$ from the line-to-line phase voltage converter 11.

The R-phase voltage signal $V_R$ in the expression (1) is extracted from the line-to-line phase voltage converter 11 by the phase voltage extractor 16. The extracted R-phase voltage signal $V_R$ is converted to the synchronous signal s by the synchronous signal generator 17. The synchronous signal s, converted by the synchronous signal generator 17, is used by the three-phase to two-phase converters 12 and 14, and the two-phase to three-phase converters 19 and 30 for conversion of three-phase to two-phase and two-phase to three-phase, respectively.

Next, the phase voltages $V_R$, $V_S$ and $V_T$ in the expression (1), which was converted by the line-to-line phase voltage converter 11, are represented with sin components for the three-phase to two-phase conversion as shown in the following expression (5):

$$\begin{bmatrix} v_R \\ v_S \\ v_T \end{bmatrix} = \begin{bmatrix} V_0\sin(\theta+\alpha_0) + V_p\sin(\theta+\alpha_p) + V_n\sin(\theta+\alpha_n) \\ V_0\sin(\theta+\alpha_0) + V_p\sin\left(\theta-\frac{2}{3}\pi+\alpha_p\right) + V_n\sin\left(\theta+\frac{2}{3}\pi+\alpha_n\right) \\ V_0\sin(\theta+\alpha_0) + V_p\sin\left(\theta+\frac{2}{3}\pi+\alpha_p\right) + V_n\sin\left(\theta-\frac{2}{3}\pi+\alpha_n\right) \end{bmatrix} \quad (5)$$

The phase voltages $V_R$, $V_S$ and $V_T$ shown in the expression (5) are converted to the voltage signals $V_d$ and $V_q$ of d-axis and q-axis as shown in the following expression (6) with the three-phase to two-phase conversion by the three-phase to two-phase converter 12:

$$\begin{bmatrix} v_d \\ v_q \end{bmatrix} = \begin{bmatrix} \sin\theta & \sin\left(\theta-\frac{2}{3}\pi\right) & \sin\left(\theta+\frac{2}{3}\pi\right) \\ \cos\theta & \cos\left(\theta-\frac{2}{3}\pi\right) & \sin\left(\theta+\frac{2}{3}\pi\right) \end{bmatrix} \begin{bmatrix} v_R \\ v_S \\ v_T \end{bmatrix} \quad (6)$$

$$= \frac{3}{2} \begin{bmatrix} V_p\cos\alpha_p - V_n\cos(2\theta+\alpha_n) \\ V_p\sin\alpha_p + V_n\sin(2\theta+\alpha_n) \end{bmatrix}$$

$$= \begin{bmatrix} v_{dp} + v_{dn} \\ v_{qp} + v_{qn} \end{bmatrix}$$

A first term of the right side of the equation (6) indicates the positive-phase components $V_{dp}$ and $V_{qp}$ of the voltage signals $V_d$ and $V_q$ of d-axis and q-axis, and a second term similarly indicates the negative-phase components $V_{dn}$ and $V_{qn}$. The voltage signals $V_d$ and $V_q$ of d-axis and q-axis are separated to the positive-phase components $V_{dp}$ and $V_{qp}$ and the negative-phase components $V_{dn}$ and $V_{qn}$ of d-axis and q-axis by the positive-phase negative-phase separator 18. The negative-phase components $V_{dn}$ and $V_{qn}$ of d-axis and q-axis, separated by the positive-phase negative-phase separator 18, are converted to the phase voltage signals $V_{Rn}$, $V_{Sn}$ and $V_{Tn}$ of only negative-phase components for three phases by the two-phase to three-phase converter 19 as shown in the following expression (7):

$$\begin{bmatrix} v_{Rn} \\ v_{Sn} \\ v_{Tn} \end{bmatrix} = \quad (7)$$

$$\frac{2}{3} \begin{bmatrix} \sin\theta & \cos\theta \\ \sin\left(\theta-\frac{2}{3}\pi\right) & \cos\left(\theta-\frac{2}{3}\pi\right) \\ \sin\left(\theta+\frac{2}{3}\pi\right) & \cos\left(\theta+\frac{2}{3}\pi\right) \end{bmatrix} \begin{bmatrix} v_{dn} \\ v_{qn} \end{bmatrix} = \begin{bmatrix} V_n\sin(\theta+\alpha_n) \\ V_n\sin\left(\theta+\frac{2}{3}\pi+\alpha_n\right) \\ V_n\sin\left(\theta-\frac{2}{3}\pi+\alpha_n\right) \end{bmatrix}$$

Negative-phase components only of the phase voltage signals, $V_{Rn}$, $V_{Sn}$ and $V_{Tn}$ are added to the zero-phase voltage signal $V_0$ by the adder 31 as shown in the following expression (8):

$$\begin{bmatrix} v_0 + v_{Rn} \\ v_0 + v_{Sn} \\ v_0 + v_{Tn} \end{bmatrix} = \begin{bmatrix} V_0\sin(\theta + \alpha_0) + V_n\sin(\theta + \alpha_n) \\ V_0\sin(\theta + \alpha_0) + V_n\sin\left(\theta + \frac{2}{3}\pi + \alpha_n\right) \\ V_0\sin(\theta + \alpha_0) + V_n\sin\left(\theta - \frac{2}{3}\pi + \alpha_n\right) \end{bmatrix} \quad (8)$$

Regarding input power, the effective power signal $P_{in}$ and a reactive power signal Q are given by the following expression (9) as a relational expression using the positive-phase components $V_{dp}$ and $V_{qp}$ of the voltage signals $V_d$ and $V_q$ of d-axis and q-axis and input current command signals $i_{dp}^*$ and $i_{qp}^*$ defined here.

$$\begin{bmatrix} P_{in} \\ Q \end{bmatrix} = \begin{bmatrix} v_{dp} & v_{qp} \\ -v_{qp} & v_{dp} \end{bmatrix} \begin{bmatrix} i_{dp}^* \\ i_{qp}^* \end{bmatrix} \quad (9)$$

The current detector 20 detects the DC output current signal $I_{dc}$ through the sensor 5b. The voltage detector 21 detects the DC output voltage signal $V_{dc}$ through the connection 5c. The DC output current signal $I_{dc}$ and the DC output voltage signal $V_{dc}$ are multiplied together by the multiplier 23 to output the DC power signal $P_{dc}$. The DC output voltage signal $V_{dc}$ is subtracted from the DC voltage commanding value signal $V_{dc}^*$ by the subtracter 22 to obtain a deviation signal. The DC voltage controller 24 generates from the deviation signal the DC voltage control signal as a result of PI control to control the DC output voltage signal $V_{dc}$ to a constant voltage value.

The DC voltage control signal, output from the DC voltage controller 24, is added to the DC output power signal $P_{dc}$ by the adder 25 to output the effective power signal $P_{in}$. Therefore, the effective power signal $P_{in}$ shown in the expression (9) is given by the following expression (10) by adding the DC voltage control signal, which is based on the deviation signal from the DC voltage commanding value signal $V_{dc}^*$ and the DC output voltage signal $V_{dc}$, and the DC output power signal $P_{dc}$.

$$P_{in} = k_p(V_{dc}^* - V_{dc}) + k_i\int(V_{dc}^* - V_{dc})dt + P_{dc} \quad (10)$$

where $k_p$ is a proportional constant, and $k_i$ an integral constant.

The reactive power Q in the expression (9) is set to zero because of control for getting the input power factor of 1. With this condition, the expression (9) is transformed to the following expression (11) for the input current command signals $i_{dp}^*$ and $i_{qp}^*$.

$$\begin{bmatrix} i_{dp}^* \\ i_{qp}^* \end{bmatrix} = \frac{1}{(v_{dp})^2 + (v_{qp})^2} \begin{bmatrix} v_{dp} & -v_{qp} \\ v_{qp} & v_{dp} \end{bmatrix} \begin{bmatrix} P_{in} \\ 0(=Q) \end{bmatrix} \quad (11)$$

The input current command converter 26 generates and outputs the input current command signals $i_{dp}^*$ and $i_{qp}^*$ based on the effective power signal $P_{in}$, calculated by the adder 25, and the positive-phase components $V_{dp}$ and $V_{qp}$ of the voltage signals of d-axis and q-axis, separated by the positive-phase negative-phase separator 18. That is, the input current command signals $i_{dp}^*$ and $i_{qp}^*$ shown in the expression (11) is an output signal from the input current command converter 26.

Regarding input current, three-phase AC input current signals $i_R$, $i_S$ and $i_T$ of three-phase AC power output from the three-phase AC power source 1 are given by the following expression (12), and detected by the current detector 13 through the sensors 3b.

$$\begin{bmatrix} i_R \\ i_S \\ i_T \end{bmatrix} = \begin{bmatrix} I_0\sin(\theta + \alpha_0') + I_p\sin(\theta + \alpha_p') + I_n\sin(\theta + \alpha_n') \\ I_0\sin(\theta + \alpha_0') + I_p\sin\left(\theta - \frac{2}{3}\pi + \alpha_p'\right) + I_n\sin\left(\theta + \frac{2}{3}\pi + \alpha_n'\right) \\ I_0\sin(\theta + \alpha_0') + I_p\sin\left(\theta + \frac{2}{3}\pi + \alpha_p'\right) + I_n\sin\left(\theta - \frac{2}{3}\pi + \alpha_n'\right) \end{bmatrix} \quad (12)$$

where $\alpha_0'$ is a zero-phase current phase angle, $\alpha_p'$ a positive-phase current phase angle, and $\alpha_n'$ a negative-phase current phase angle.

The three-phase AC input current signals $i_R$, $i_S$ and $i_T$ are converted by the three-phase to two-phase converter 14 to current signals $i_d$ and $i_q$ of d-axis and q-axis shown in the following expression (13).

$$\begin{bmatrix} i_d \\ i_q \end{bmatrix} = \begin{bmatrix} \sin\theta & \sin\left(\theta - \frac{2}{3}\pi\right) & \sin\left(\theta + \frac{2}{3}\pi\right) \\ \cos\theta & \cos\left(\theta - \frac{2}{3}\pi\right) & \cos\left(\theta + \frac{2}{3}\pi\right) \end{bmatrix} \begin{bmatrix} i_R \\ i_S \\ i_T \end{bmatrix} \quad (13)$$

$$= \frac{3}{2}\begin{bmatrix} I_p\cos\alpha_p' - I_n\cos(2\theta + \alpha_n') \\ I_p\sin\alpha_p' + I_n\sin(2\theta + \alpha_n') \end{bmatrix}$$

The current signals $i_d$ and $i_q$ are output to the subtracter 27 as feedback values of the input current. The subtracter 27 subtracts the current signals $i_d$ and $i_q$, converted by the three-phase to two-phase converter 14, from the input current command signals $i_{dp}^*$ and $i_{qp}^*$ calculated by the input current command converter 26, to generate a deviation signal. The input current controller 28 generates an input current control signal with a certain operation for controlling the input current to a constant current value, based on the deviation signal calculated by the current signals $i_d$ and $i_q$ and the input current command signals $i_{dp}^*$ and $i_{qp}^*$. The adder 29 adds the input current control signals output from the input current controller 28, and the positive-phase components $V_{dp}$ and $V_{qp}$ of voltage signals of d-axis and q-axis, separated by the positive-phase negative-phase separator 18, and generates control signals $C_d$ and $C_q$ shown in the following expression (14).

$$\begin{aligned} C_d &= k_p'(i_{dp}^* - i_d) + k_i'\int(i_{dp}^* - i_d)dt + \omega L \cdot i_q + V_{dp} \\ C_q &= k_p''(i_{qp}^* - i_q) + k_i''\int(i_{qp}^* - i_q)dt + \omega L \cdot i_d + V_{dp} \end{aligned} \quad (14)$$

where $k_p'$ and $k_p''$ are proportional constants, and $k_i'$ and $k_i''$ integral constants.

The two-phase control signals $C_d$ and $C_q$ shown in the expression (14) are converted by the two-phase to three-phase converter 30 to the control signals $C_u$, $C_v$ and $C_w$ for three phases as shown in the following expression (15).

$$\begin{bmatrix} C_u \\ C_v \\ C_w \end{bmatrix} = \begin{bmatrix} \sin\theta & \cos\theta \\ \sin\left(\theta - \frac{2}{3}\pi\right) & \cos\left(\theta - \frac{2}{3}\pi\right) \\ \sin\left(\theta + \frac{2}{3}\pi\right) & \cos\left(\theta + \frac{2}{3}\pi\right) \end{bmatrix} \begin{bmatrix} C_d \\ C_q \end{bmatrix} \quad (15)$$

As shown in the following expression (16), the adder 32 adds the control signals $C_u$, $C_v$ and $C_w$ to the added values output from the adder 31, the added values being sum of the negative-phase components $V_{Rn}$, $V_{Sn}$ and $V_{Tn}$ and the zero-phase voltage signal $V_0$, and outputs the gate control signals $G_u'$, $G_v'$ and $G_w'$.

$$\begin{bmatrix} G'_u \\ G'_v \\ G'_w \end{bmatrix} = \begin{bmatrix} C_u \\ C_v \\ C_w \end{bmatrix} + \begin{bmatrix} v_0 + v_{Rn} \\ v_0 + v_{Sn} \\ v_0 + v_{Tn} \end{bmatrix} \quad (16)$$

The control pulse signal generator 34 compares the gate control signals $G_u'$, $G_v'$ and $G_w'$ with the triangular wave signal generated by the carrier frequency generator 33 to generate the gate pulse signals Gu, Gv, Gw, Gx, Gy and Gz as a result of PWM (pulse width modulation) conversion, and outputs to the respective gates of the transistors 4u, 4v, 4w, 4x, 4y and 4z for on/off-control of respective gates.

The operations of the power converter 100 will now be described in a balanced state and at the time of instantaneous voltage drop. It is assumed here that the amount of the DC load is constant. Before occurrence of the instantaneous voltage drop, the three-phase AC input voltage of the three-phase AC power source 1 is in a balanced state. The phase voltage signals $V_R$, $V_S$ and $V_T$, shown in the expression (1), have only the positive phase voltage signal $V_p$, and therefore the phase voltage signals $V_R'$, $V_S'$ and $V_T'$, shown in the expression (2), become equal to the phase voltage signals $V_R$, $V_S'$ and $V_T$. At this time, the voltage signals $V_d$ and $V_q$ of d-axis and q-axis shown in the expression (6) are represented by the following expression (17), where the voltage component of q-axis becomes zero.

$$\begin{bmatrix} v_d \\ v_q \end{bmatrix} = \begin{bmatrix} \frac{3}{2} V_p \\ 0 \end{bmatrix} \begin{bmatrix} v_{dp} \\ 0 \end{bmatrix} \quad (17)$$

At this time, by replacing the expression (17) by the expression (11), the input current command signals $i_{dp}^*$ and $i_{qp}^*$ are represented by the following expression (18):

$$\begin{bmatrix} i_{dp}^* \\ i_{qp}^* \end{bmatrix} = \frac{1}{(v_{dp})^2} \begin{bmatrix} v_{dp} & 0 \\ 0 & v_{dp} \end{bmatrix} \begin{bmatrix} P_{in} \\ 0 \end{bmatrix} = \begin{bmatrix} \frac{P_{in}}{v_{dp}} \\ 0 \end{bmatrix} \quad (18)$$

Since the input current command signals $i_{qp}^*$ is zero from the expression (18), the input current is so controlled by the input current command converter 26 that the input power factor becomes 1. The DC output voltage is also controlled to a constant value by the DC voltage controller 24. Therefore, a constant DC power is always sent out to the side of the DC load 9.

A description will now be given of an unbalanced state in which the AC input voltage becomes unbalanced because of the instantaneous voltage drop in at least one phase of AC input voltage of the three-phase AC input voltages from the three-phase AC power source 1. When the instantaneous voltage drop occurs in the AC input voltage, the positive-phase components $V_{dp}$ and $V_{qp}$ of voltage signals on d-axis and q-axis as well as the negative-phase components $V_{dn}$ and $V_{qn}$ shown in the expression (6) are generated at the output of the positive-phase negative-phase separator 18, and the zero-phase voltage signal $V_0$ shown in the expression (4) is also generated at the output of the zero-phase voltage extractor 15.

The positive-phase components $V_{dp}$ and $V_{qp}$ are added to the input current control signal by the adder 29. The negative-phase components $V_{dn}$ and $V_{qn}$ are added to the control signals $C_u$, $C_v$ and $C_w$ by the adder 32. With this, even when the three-phase AC input voltage drops instantaneously, the DC output power is controlled constant, and the power converter 4 is so controlled that the input current flows so as to have the input power factor of 1.

Figure 3A:
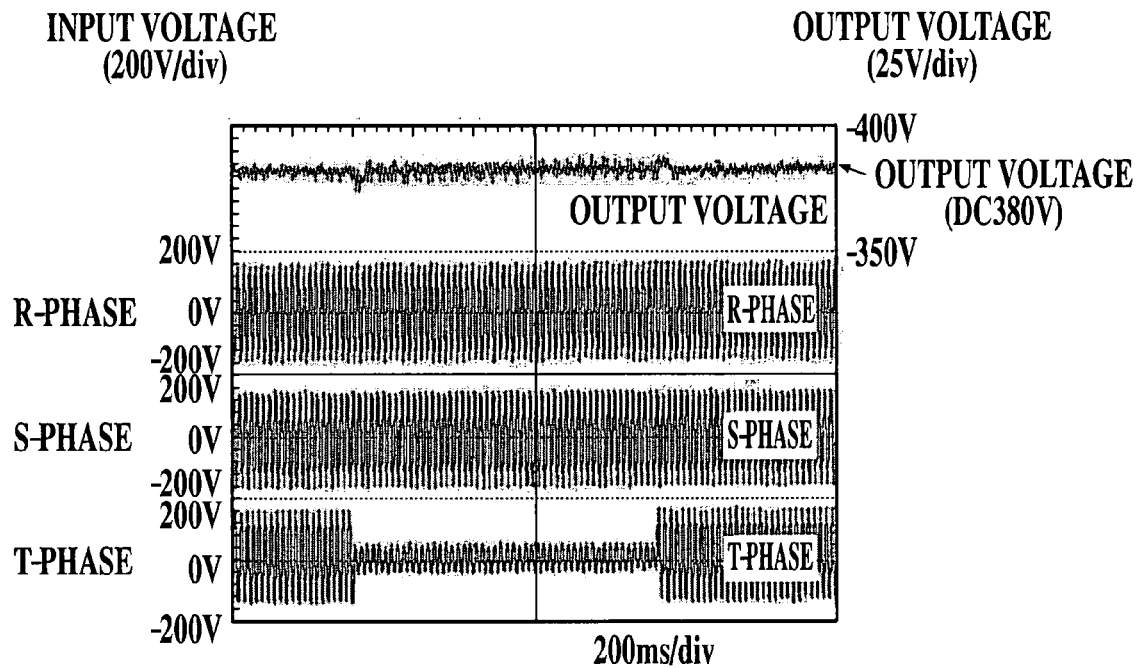
FIG. 3A a view showing three-phase input voltages and an output voltage when instantaneous voltage drop occurs.
Figure 3B:
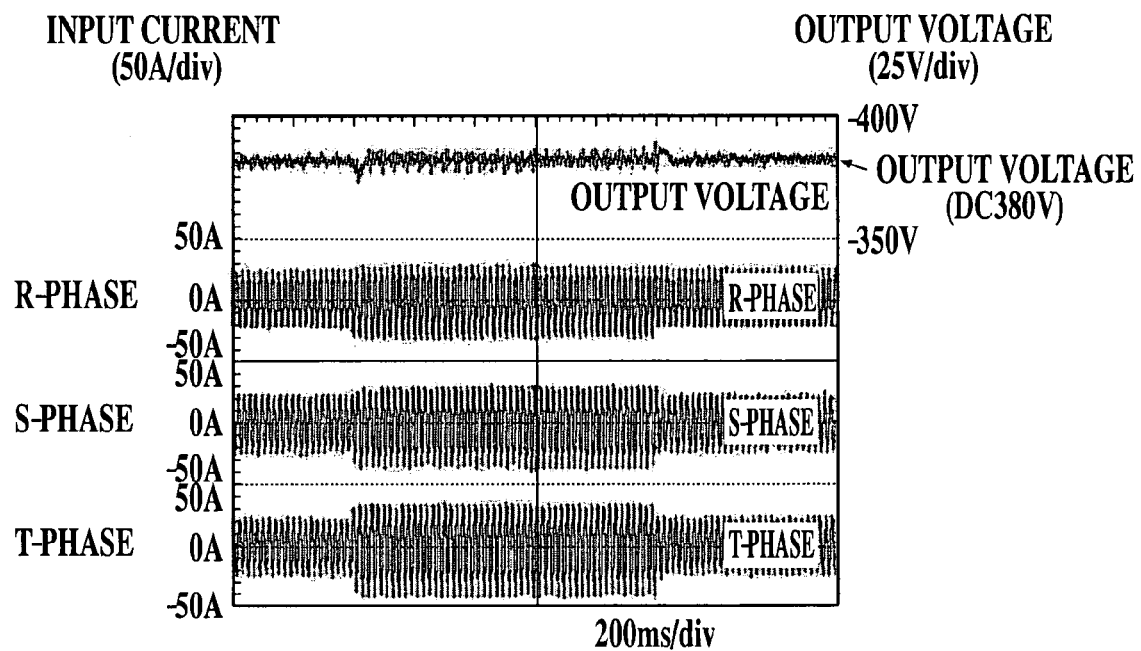
FIG. 3B shows three-phase input currents and an output voltage when instantaneous voltage drop occurs.

Referring to FIG. 3, a description will be given of one example of waveforms when an instantaneous voltage drop occurs on the AC input voltage in the power conversion apparatus 100. FIG. 3A shows input voltages for three phases and an output voltage when an instantaneous voltage drop occurs. FIG. 3B shows input currents for three phases and an output voltage when an instantaneous voltage drop occurs.

Here, let it be considered as a condition of the instantaneous voltage drop that the T-phase voltage of the three-phase AC input voltage drops by 30% of a rated voltage in the power conversion apparatus 100. Further, the rated voltage of the AC input phase voltage was set to AC 115 V, and the DC output voltage to DC 380 V.

As shown in FIG. 3A, it is understood that the DC output voltage maintains a constant voltage even when the AC input voltage drops instantaneously in the power conversion apparatus 100. As shown in FIG. 3B, AC input R-, S- and T-phase currents increase when the instantaneous voltage drop occurs, compared with the balanced state of the AC input voltages. Since the power conversion apparatus 100 continues supplying the same current to the DC load 9 even when the instantaneous voltage drop occurs, the AC input current increases.

According to the power conversion apparatus 100 of the embodiment, instantaneous voltage-drop compensation can be performed with conversion of AC input power itself, and stable power can be supplied to the DC load 9 even when the input voltage instantaneously drops. This allows the structure for the instantaneous voltage-drop compensation to be smaller with longer life at lower cost, compared with a structure for compensating an instantaneous voltage drop with use of a power storage device such as a condenser or a battery, and also allows easier maintenance of the structure because the power storage device, such as a condenser or a battery, is not used. Further, this compensation improves the power factor, allowing harmonics suppression with the power factor correction.

Further, the input current command converter 26 generates the input current command signals $i_{dp}^*$ and $i_{qp}^*$ from the positive-phase components $V_{dp}$ and $V_{qp}$ of the voltage signals on d-axis and q-axis based on the AC input voltage and the DC voltage control signal based on the DC output voltage. Therefore, response of the input current command signal to the fluctuation of the AC input voltage can be made speedier. This allows suppression of transient change of the DC output voltage.

The current detector 20, the voltage detector 21 and the multiplier 23 detects a DC output power signal, and the adder 25 adds the DC output power signal to the DC voltage control signal. Therefore, response to the load change of the DC load 9, to which the DC output power is output, can be made speedier. This allows suppression of transient change of the DC output voltage.

The synchronous signal generator 17 generates a synchronous signal s, and the three-phase to two-phase converters 12 and 14 and the two-phase to three-phase converters 19 and 30 perform three-phase to two-phase conversion and two-phase to three-phase conversion, respectively, based on the synchronous signal s. Therefore, the power factor can be always maintained to 1 irrespective of balance or unbalance of the AC input voltages.

The line voltage detector 10 and the line-to-line phase voltage converter 11 detect the line voltage signals $V_{RS}$, $V_{ST}$ and $V_{TR}$, and convert to the phase voltage signals $V_R$, $V_S$ and $V_T$. Therefore, instantaneous voltage-drop compensation can be performed irrespective of adopting a three-phase three-wire system or a three-phase four-wire system for the AC system of the three-phase AC input power source 1.

(First Modification)

A first modification of the above-described first embodiment will be explained.

In the power conversion apparatus 100 of the first embodiment, when the AC input voltage instantaneously drops, the calorific value of power conversion elements increases because of increase of the input current. In an instantaneous time (0.5-5 sec) normally defined, the cooling function of the power conversion apparatus 100 need not be intensified. However, if the input voltage largely drops for a long time, the calorific value of power conversion elements increases proportionally to the power.

For solving this problem, a power conversion apparatus 100 of this modification is provided with a cooling device, such as a fan, for cooling the power conversion elements. By intensifying the cooling function for the power conversion elements by the cooling device, stable power can be supplied to the DC load 9 even when the input voltage largely drops for a long time, and a power conversion apparatus having power factor correction can be provided.

According to this modification, even when the input voltage largely drops for a long time, stable power can be supplied to the DC load 9, and a power conversion apparatus having power factor correction can be also achieved.

(Second Modification)

Figure 4:
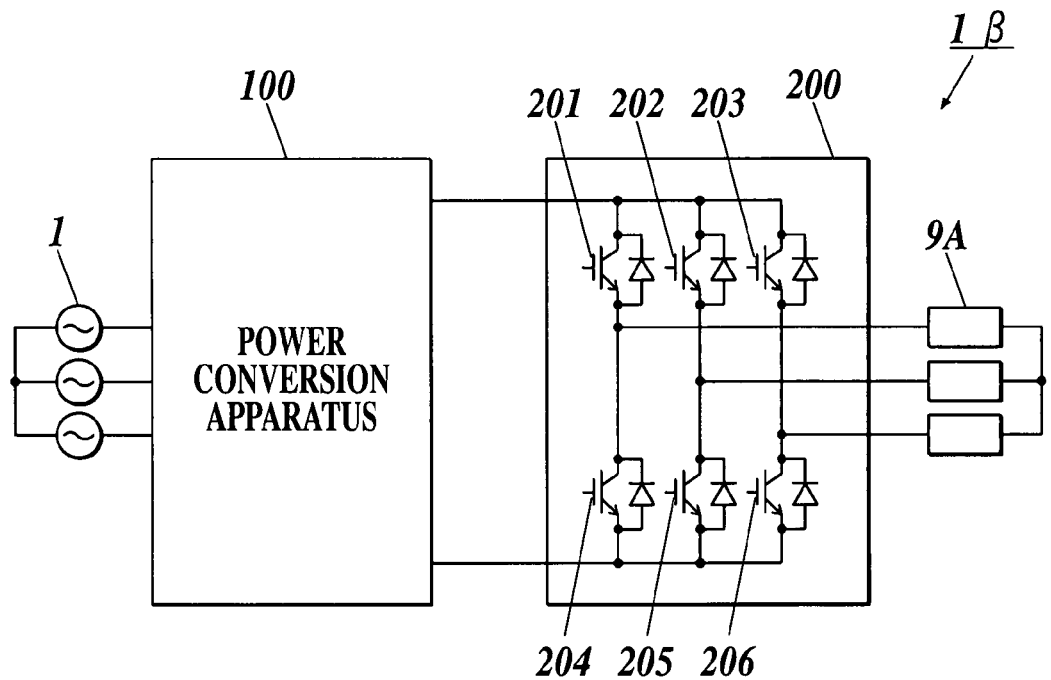
FIG. 4 is a view showing a power conversion system 1β according to a second modification.

A second modification of the first embodiment will be described with reference to FIG. 4. FIG. 4 shows a power conversion system 1β of this modification.

As shown in FIG. 4, the power conversion system 1β includes three-phase AC power source 1, power conversion apparatus 100, DC/AC conversion circuit 200, and three-phase AC loads 9A. The DC/AC conversion circuit 200 is an inverter or the like, and includes transistors 201-206 having respective diodes. The three-phase AC loads 9A are loads to which three-phase AC power is input.

The DC/AC conversion circuit 200 converts the DC output power output from the power conversion apparatus 100 to the three-phase AC output power with on/off control of respective gates of the transistors 201-206, and supplies the power to the three-phase AC loads 9A.

According to the modification, even when the input voltage instantaneously drops, stable power can be supplied to the three-phase AC loads 9A, and a three-phase AC power source having power factor correction can be also achieved.

(Third Modification)

Figure 5:
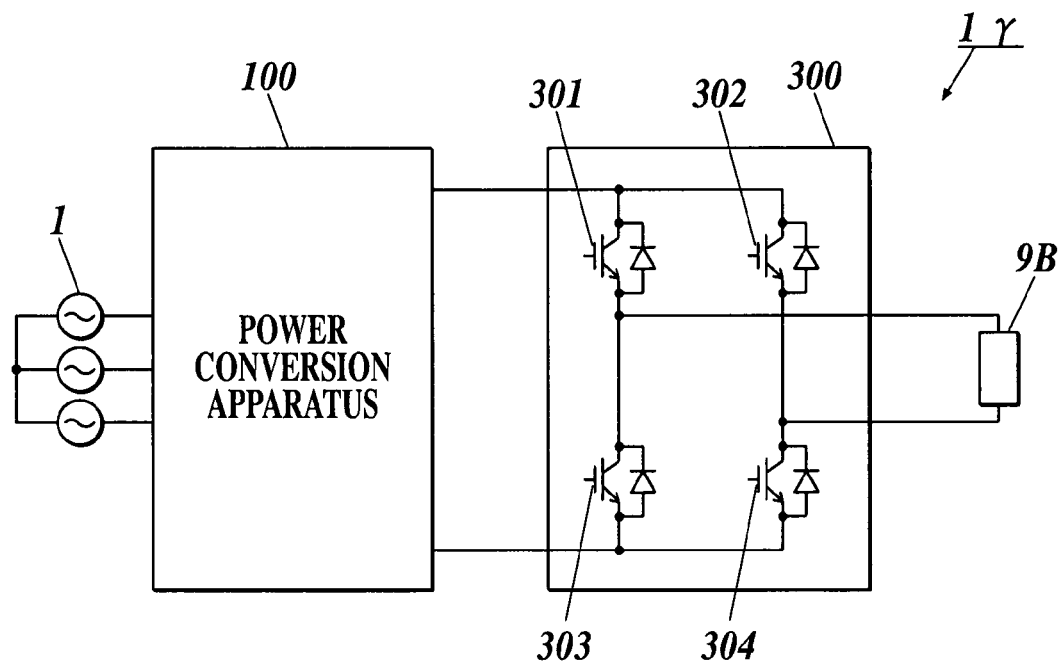
FIG. 5 is a view showing a power conversion system 1γ according to a third modification.

A third modification of the first embodiment will be described with reference to FIG. 5. FIG. 5 shows a power conversion system 1γ of the modification.

As shown in FIG. 5, the power conversion system 1γ includes three-phase AC power source 1, power conversion apparatus 100, DC/AC conversion circuit 300, and single-phase AC load 9B. The DC/AC conversion circuit 300 is an inverter or the like, and includes transistors 301-304 having respective diodes. The single-phase AC load 9B is a load to which single-phase AC power is input.

The DC/AC conversion circuit 300 converts the DC output power output from the power conversion apparatus 100 to the single-phase AC output power with on/off control of respective gates of the transistors 301-304, and supplies the power to the single-phase AC load 9B.

According to the modification, even when the input voltage instantaneously drops, stable power can be supplied to the single-phase AC load 9B, and a single-phase AC power source having power factor correction can be also achieved.

Fourth Embodiment

Figure 6:
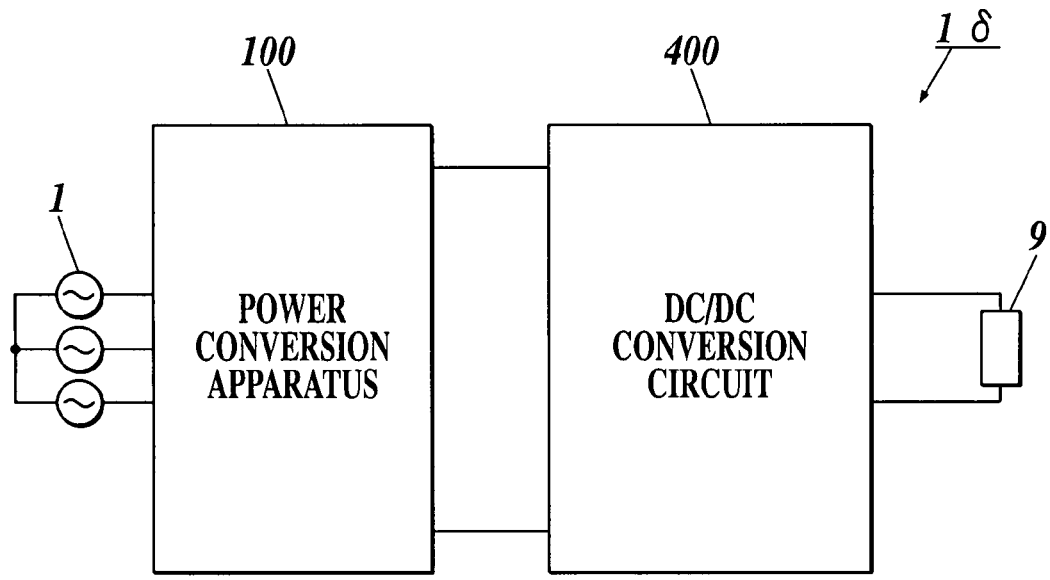
FIG. 6 is a view showing a power conversion system 1δ according to a fourth modification.

A fourth modification of the first embodiment will be described with reference to FIG. 6. FIG. 6 shows a power conversion system 1δ of the modification.

As shown in FIG. 6, the power conversion system 1δ includes three-phase AC power source 1, power conversion apparatus 100, DC/DC conversion circuit 400, and DC load 9.

The DC/DC conversion circuit 400 converts the current value of the DC output power output from the power conversion apparatus 100 and supplies the power to the DC load 9.

According to the modification, even when the input voltage instantaneously drops, stable power can be supplied to the DC load 9 and a DC power source having power factor correction can be provided.

Second Embodiment

A second embodiment according to the invention will be described with reference to FIGS. 7 and 8. The embodiment partly has the same structure as of the first embodiment, and therefore differences from the first embodiment will be chiefly described.

Figure 7:
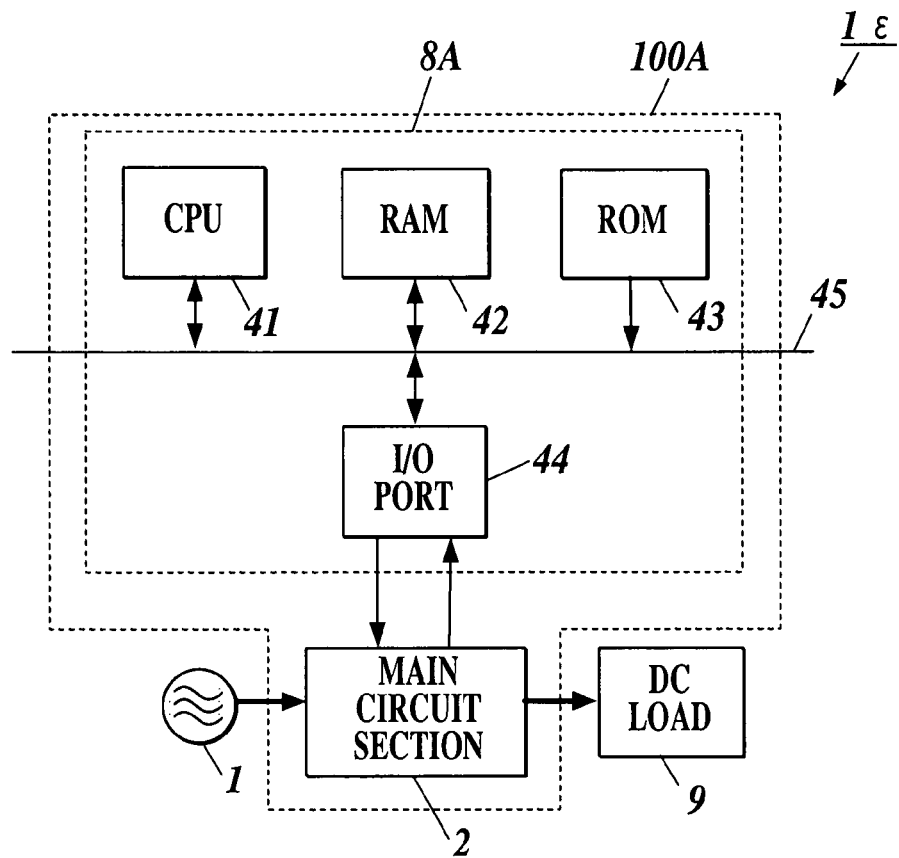
FIG. 7 is a view showing a configuration of a power conversion system 1ε according to a second embodiment of the invention.

Referring first to FIG. 7, an apparatus configuration of a power conversion system of the embodiment will be described. FIG. 7 shows a power conversion system 1ε of the embodiment.

Functions of the power conversion and the instantaneous voltage-drop compensation are implemented with the circuit structure in the power conversion system 1α of the first embodiment, and with execution of programs in the power conversion system 1ε of the embodiment.

As shown in FIG. 7, the power conversion system 1ε includes the three-phase AC power source 1, a power conversion apparatus 100A, and the DC load 9. The power conversion apparatus 100A includes the main circuit section 2 and an instantaneous voltage-drop compensation circuit 8A. The compensation circuit 8A includes CPU (central processing unit) 41, RAM (random access memory) 42, ROM (read only memory) 43 and I/O section 44, and each section is connected to a bus 45.

The CPU 41 integrally controls each section of the compensation circuit 8A. The CPU 41 develops a designated program into the RAM 42 out of a system program and various application programs, which are stored in the ROM 43, and executes various processing in cooperation with the program developed in the RAM 42.

The CPU 41 controls the main circuit section 2 in cooperation with a power conversion control program to convert the three-phase AC input power, input from the three-phase AC power source 1, to the DC output power, and compensates the DC output power when the AC input voltage drops instantaneously.

The RAM 42 is a volatile memory storing various kinds of information, and acts as a work area where various kinds of data and programs are developed. The ROM 43 is a memory readably storing various kinds of information, and stores the power conversion control program.

The I/O section 44 intermediates between the main circuit section 2 for input/output of various signals. The I/O section 44 receives from the main circuit section 2 the line voltages of the three-phase AC input voltages at the connections 3a in the AC input section 3, the R-phase and T-phase AC input currents at the sensors 3b, the DC output current at the sensor 5b in the DC output section 5, and the DC output voltage at the connection 5c. Further, the I/O section 44 in the compensation circuit 8A outputs the gate pulse signals Gu, Gv, Gw, Gx, Gy and Gz, which control the transistors 4u, 4v, 4w, 4x, 4y and 4z in the power converter 4 to the main circuit section 2.

Figure 8:
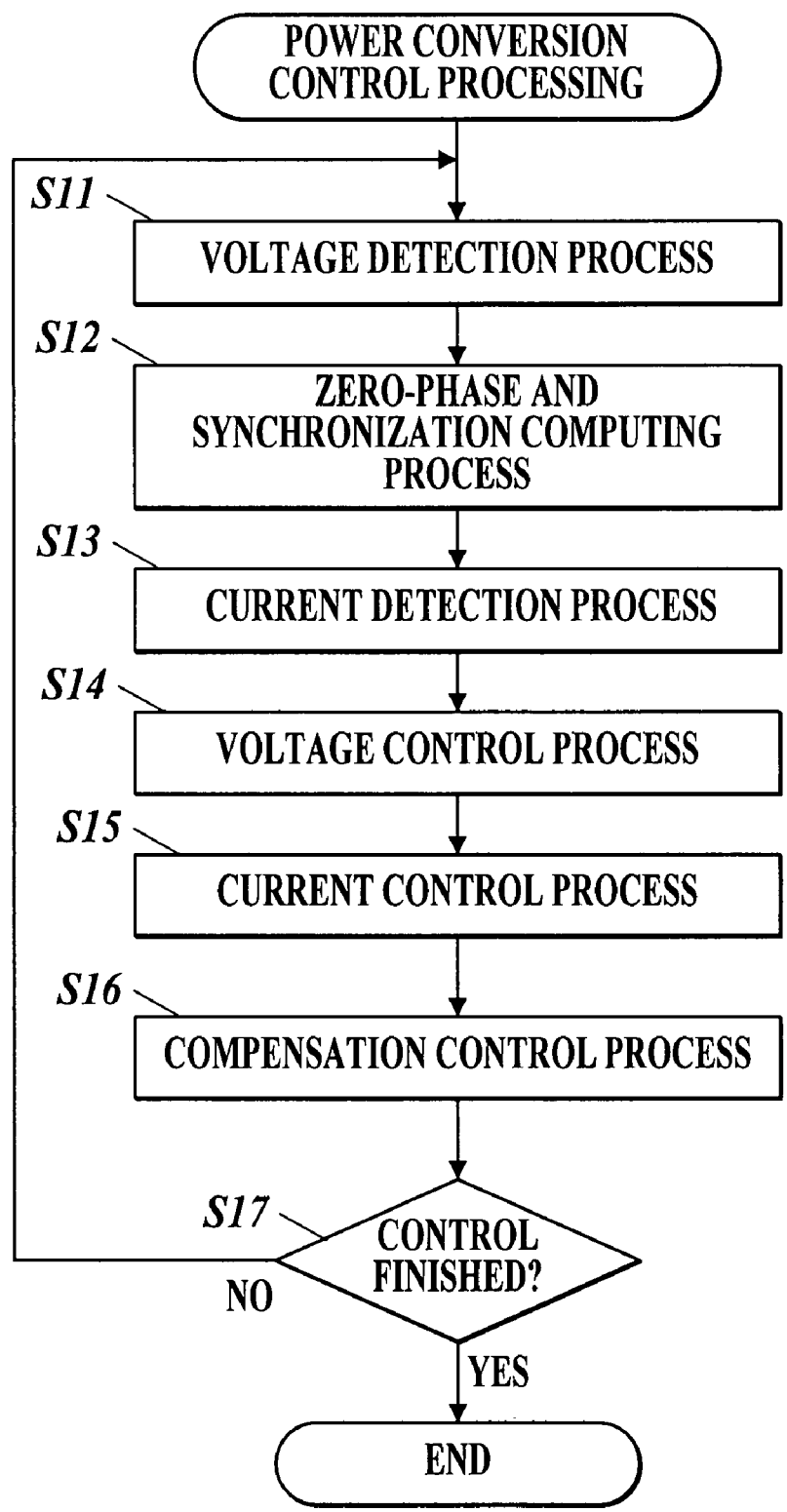
FIG. 8 is a flow chart representing power conversion control.
Figure 9:
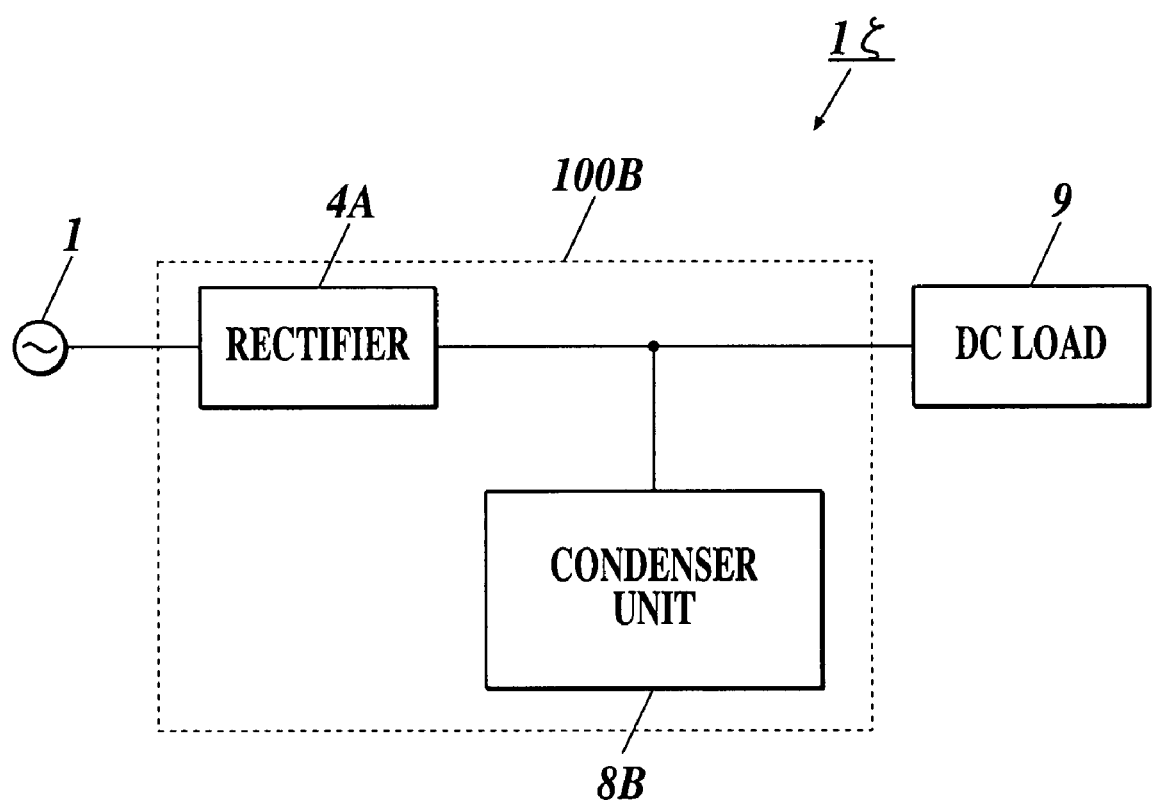
FIG. 9 shows a configuration of a conventional power conversion system 1ζ.

Referring to FIG. 8, the operations of the power conversion system 1ε of the embodiment will be described. FIG. 8 shows a flow of power conversion control.

In the instantaneous voltage-drop compensation circuit 8A, by being triggered with outputting of three-phase AC power from the three-phase AC power source 1 for example, there are executed the power conversion programs which are read from the ROM 43 and developed to the RAM 42, and the power conversion control processing in cooperation with the CPU 41.

As shown in FIG. 8, first, a power detection process is executed (step S11). At step S11, the three-phase AC voltages are obtained from the main circuit 2 through the I/O section 44, and the obtained line voltage signals $V_{RS}$, $V_{ST}$ and $V_{TR}$ are detected. The line voltage signals $V_{RS}$, $V_{ST}$ and $V_{TR}$ are then converted to the three-phase phase voltage signals $V_R'$, $V_S'$ and $V_T'$.

The three-phase phase voltage signals $V_R'$, $V_S'$ and $V_T'$ are converted to the two-phase voltage signals $V_d$ and $V_q$ of d-axis and q-axis. The voltage signals $V_d$ and $V_q$ are then separated to the positive-phase components $V_{dp}$ and $V_{qp}$ and the negative-phase components $V_{dn}$ and $V_{qn}$. The negative-phase components $V_{dn}$ and $V_{qn}$ are converted to the phase voltage signals $V_{Rn}$, $V_{Sn}$ and $V_{Tn}$ of three-phases. That is, step S11 corresponds to the processing executed by voltage detector 10a, three-phase to two-phase converter 12, positive-phase negative-phase separator 18, and two-phase to three-phase converter 19.

Here, each processing in step S11 is appropriately executed in parallel. The parallel executions within each step are similarly performed in following steps S11-S16.

Next, a zero-phase and synchronization computing process is executed (step S12). At step S12, the zero-phase voltage signal $V_0$ is extracted by the expression (4) using the phase voltage signals $V_R'$, $V_S'$ and $V_T'$. From the phase voltage signals $V_R'$, $V_S'$ and $V_T'$, the phase voltages $V_R$, $V_S$ and $V_T$ are calculated, then the phase voltage signal $V_R$ is extracted. The synchronous signal s is generated from the R-phase voltage signal $V_R$. The synchronous signal s is used for synchronization with two-phase to three-phase conversion and three-phase to two-phase conversion at steps S11, S13 and S16. At this time, the synchronous signal s at step S12, executed just before, (or synchronous signal s of an initial value) is used. Thus, step S12 corresponds to the processing executed by line-to-line phase voltage converter 11, zero-phase voltage extractor 15, phase voltage extractor 16, and synchronous voltage generator 17.

Next, a current detection process is executed (step S13). At step S13, the three-phase AC input currents $i_R$, $i_S$ and $i_T$, which are input from the main circuit 2 through the I/O section 44, are detected. The three-phase AC input currents $i_R$, $i_S$ and $i_T$ are converted into the current signals $i_d$ and $i_q$ of d-axis and q-axis. Step S13 corresponds to the processing executed by the current detector 13 and the three-phase to two-phase converter 14.

Subsequently, a voltage control process is executed (step S14). At step S14, the DC output current signal $I_{dc}$ and the DC output voltage signal $V_{dc}$ are detected from the main circuit 2 through the I/O section 44. The DC output current signal $I_{dc}$ and the DC output voltage signal $V_{dc}$ are multiplied by the multiplier 23 to calculate the DC power signal $P_{dc}$. The DC output voltage signal $V_{dc}$ is subtracted from the DC voltage commanding value signal $V_{dc}^*$ to obtain a deviation signal. Then, the DC voltage control signal is generated from the deviation signal so as to control the DC output voltage signal $V_{dc}$ to a constant voltage value. The DC voltage control signal and the DC power signal $P_{dc}$ are added together to generate the effective power signal $P_{in}$. Step S14 corresponds to the processing executed by current detector 20, voltage detector 21, subtracter 22, multiplier 23, DC voltage controller 24, and adder 25.

Next, a current control process is executed (step S15). At step S15, based on the effective power signal $P_{in}$ generated at step S14 and the positive-phase components $V_{dp}$ and $V_{qp}$ of the voltage signals of d-axis and q-axis separated at step S11, the input current command signals $i_{dp}^*$ and $i_{qp}^*$ are generated. The d- and q-axes current signals $i_d$ and $i_q$ converted at step S13 are subtracted from the input current command signals $i_{dp}^*$ and $i_{qp}^*$ to generate a deviation signal. The input current control signals are generated based on the deviation signal. Step S15 corresponds to the processing executed by the input current command converter 26, the subtracter 27, and the input current controller 28.

Thereafter, a compensation control process is executed (step S16). At step S16, the input current control signals generated at step S15 and the positive-phase components $V_{dp}$ and $V_{qp}$ of voltage signals of d-axis and q-axis, separated at step S11, are added together to generate the control signals $C_d$ and $C_q$ shown in the expression (14). The two-phase control signals $C_d$ and $C_q$ are converted to the three-phase control signals $C_u$, $C_v$ and $C_w$. The phase voltage signals $V_{Rn}$, $V_{Sn}$ and $V_{Tn}$ obtained at step S11 and the zero-phase voltage signal $V_0$ extracted at step S12 are added together. The added signals are added to the control signals $C_u$, $C_v$ and $C_w$ to output the gate control signals $G_u'$, $G_v'$ and $G_w'$.

Subsequently, the gate control signals $G_u'$, $G_v'$ and $G_w'$ are compared with the generated triangular wave signal, and the gate pulse signals Gu, Gv, Gw, Gx, Gy and Gz are generated. The gate pulse signals Gu, Gv, Gw, Gx, Gy and Gz are output to the respective gates of the transistors 4u, 4v, 4w, 4x, 4y and 4z in the power converter 4 through the I/O section 44. Step S16 corresponds to the processing executed by adder 29, two-phase to three-phase converter 30, adders 31 and 32, carrier frequency generator 33, and control pulse signal generator 34.

Thereafter, it is determined whether the power conversion control processing has finished (step S17). If the power conversion control processing has not finished (NO at step S17), the processing moves to step S11. If the power conversion control processing has finished (YES at step S17), the processing ends.

According to the power conversion apparatus 100A of the embodiment, the apparatus 100A can achieve the same effects as of the power conversion apparatus 100 of the first embodiment.

The above-described embodiments and modifications are some examples of the instantaneous voltage-drop compensation circuit, the instantaneous voltage-drop compensation method, and the instantaneous voltage-drop compensation program, and the invention is not limited to these examples.

For example, at least two of the above-described embodiments and modifications may be appropriately combined. For example, such a structure may be employed that the second embodiment is applied to the first to fourth modifications.

In the above-described embodiments and modifications, the input current control signals are added to the positive-phase components $V_{dp}$ and $V_{qp}$ of voltage signals of d-axis and q-axis, the result is applied to two-phase to three-phase conversion, then the result is added to the phase voltage signals $V_{Rn}$, $V_{Sn}$, and $V_{Tn}$ and the zero-phase voltage signal $V_0$. Alternatively, the input current control signals may be added to the positive-phase components $V_{dp}$ and $V_{qp}$ of voltage signals of d-axis and q-axis, the phase voltage signals $V_{Rn}$, $V_{Sn}$ and $V_{Tn}$ and the zero-phase voltage signal $V_0$, and then applied to two-phase to three-phase conversion.

It is also to be understood that detailed structures and operations of the power conversion systems 1α-1ε in the above-described embodiments and modifications may be appropriately changed without departing from the spirit of the invention.

The present U.S. patent application claims a priority under the Paris Convention of Japanese patent application No. 2006-326912 filed on Dec. 4, 2006, and shall be a basis of correction of an incorrect translation.

What is claimed is:

1. An instantaneous voltage-drop compensation circuit comprising:
    a first voltage detector which detects three-phase voltages to be input to a power converter and outputs three-phase voltage signals, the converter converting three-phase alternating current to direct current, based on control pulse signals;
    a first three-phase to two-phase converter which converts the detected three-phase voltage signals to two-phase voltage signals;
    a first current detector which detects three-phase currents to be input to the power converter and outputs three-phase current signals;
    a second three-phase to two-phase converter which converts the detected three-phase current signals to two-phase current signals;
    a first subtracter which generates a first deviation signal from input current command signals and the two-phase current signals;
    an input current controller which generates input current control signals based on the first deviation signal;
    a first adder which adds the two-phase voltage signals to the input current control signals;
    a first two-phase to three-phase converter which converts input current control signals, to which the two-phase voltage signals have been added, to three-phase control signals;
    a control pulse signal generator which generates the control pulse signals for the power converter based on the three-phase control signals and outputs the control pulse signals to the power converter;
    a positive-phase negative-phase separator which separates the converted two-phase voltage signals into positive-phase components and negative-phase components;
    a second two-phase to three-phase converter which converts the separated negative-phase components of the two-phase voltage signals to negative-phase components of the three-phase voltage signals;
    a zero-phase voltage extractor which extracts a zero-phase voltage signal from the detected three-phase voltage signals; and
    a second adder which adds the negative-phase components of the three-phase voltage signals and the zero-phase voltage signal to the three-phase control signals,
    wherein the first adder adds the separated positive-phase components of the two-phase voltage signals to the input current control signals, and
    the control pulse signal generator generates the control pulse signals based on three-phase control signals resulted from the sum of the negative-phase components of the three-phase voltage signals and the zero-phase voltage signal.

2. The instantaneous voltage-drop compensation circuit according to claim 1, further comprising:
    a second voltage detector which detects a DC voltage output from the power converter and outputs a DC voltage signal;
    a second subtracter which generates a second deviation signal from a voltage commanding value signal and the DC voltage signal;
    a DC voltage controller which generates a DC voltage control signal based on the second deviation signal; and
    an input current command converter which generates the input current command signals based on the DC voltage control signal and the positive-phase components of the two-phase voltage signals.

3. The instantaneous voltage-drop compensation circuit according to claim 2, further comprising:
    a second current detector which detects a DC current output from the power converter and outputs a DC current signal;
    a multiplier which multiplies the DC voltage signal by the DC current signal and outputs a DC power signal; and
    a third adder which adds the DC power signal to the DC voltage control signal,
    wherein the input current command converter generates the input current command signals based on DC voltage control signal to which the DC power signal has been added, and the positive-phase components of the two-phase voltage signals.

4. The instantaneous voltage-drop compensation circuit according to claim 1, further comprising:
    a phase voltage extractor which extracts a phase voltage signal from the three-phase voltage signals; and
    a synchronous signal generator which generates and outputs a synchronous signal from the extracted phase voltage signal,
    wherein the first three-phase to two-phase converter, the second three-phase to two-phase converter, the first two-phase to three-phase converter and the second two-phase to three-phase converter operate in synchronism with the synchronous signal.

5. The instantaneous voltage-drop compensation circuit according to claim 1, wherein the first voltage detector comprises:
    a line voltage detector which detects three-phase line voltages to be input to the power converter and outputs three-phase line voltage signals; and
    a line-to-line phase voltage converter which converts the detected three-phase line voltage signals to three phase voltage signals.

6. A power conversion apparatus comprising:
    the power converter; and
    the instantaneous voltage-drop compensation circuit according to claim 1.

7. An instantaneous voltage-drop compensation method comprising:
    a first voltage detecting step to detect three-phase voltages to be input to a power converter and to output three-phase voltage signals, the converter converting three-phase alternating current to direct current, based on control pulse signals;

a first three-phase to two-phase converting step to convert the detected three-phase voltage signals to two-phase voltage signals;

a first current detecting step to detect three-phase currents to be input to the power converter and to output three-phase current signals;

a second three-phase to two-phase converting step to convert the detected three-phase current signals to two-phase current signals;

a first subtracting step to generate a first deviation signal from input current command signals and the two-phase current signals;

an input current controlling step to generate input current control signals based on the first deviation signal;

a first adding step to add the two-phase voltage signals to the input current control signals;

a first two-phase to three-phase converting step to convert input current control signals to which the two-phase voltage signals have been added, to three-phase control signals;

a control pulse signal generating step to generate the control pulse signals for the power converter based on the three-phase control signals and to output the control pulse signals to the power converter;

a positive-phase negative-phase separating step to separate the converted two-phase voltage signals into positive-phase components and negative-phase components;

a second two-phase to three-phase converting step to convert the separated negative-phase components of the two-phase voltage signals to negative-phase components of the three-phase voltage signals;

a zero-phase voltage extracting step to extract a zero-phase voltage signal from the detected three-phase voltage signals; and a second adding step to add the negative-phase components of the three-phase voltage signals and the zero-phase voltage signal to the three-phase control signals, wherein in the first adding step, the separated positive-phase components of the two-phase voltage signals are added to the input current control signals, and in the control pulse signal generating step, the control pulse signals are generated based on three-phase control signals resulted from the sum of the negative-phase components of the three-phase voltage signals and the zero-phase voltage signal.

8. The instantaneous voltage-drop compensation method according to claim 7, further comprising:

a second voltage detecting step to detect a DC voltage output from the power converter and to output a DC voltage signal;

a second subtracting step to generate a second deviation signal from a voltage commanding value signal and the DC voltage signal;

a DC voltage control step to generate a DC voltage control signal based on the second deviation signal; and an input current command converting step to generate the input current command signals based on the DC voltage control signal and the positive-phase components of the two-phase voltage signals.

9. The instantaneous voltage-drop compensation method according to claim 8, further comprising:

a second current detecting step to detect a DC current output from the power converter and to output a DC current signal;

a multiplying step to multiply the DC voltage signal by the DC current signal and to output a DC power signal; and a third adding step to add the DC power signal to the DC voltage control signal, wherein in the input current command converting step, the input current command signals are generated based on DC voltage control signal to which the DC power signal has been added, and the positive-phase components of the two-phase voltage signals.

10. The instantaneous voltage-drop compensation method according to claim 7, further comprising:

a phase voltage extracting step to extract a phase voltage signal from the three-phase voltage signals; and a synchronous signal generating step to generate and output a synchronous signal from the extracted phase voltage signal, wherein the first three-phase to two-phase converting step, the second three-phase to two-phase converting step, the first two-phase to three-phase converting step and the second two-phase to three-phase converting step are performed in synchronism with the synchronous signal.

11. The instantaneous voltage-drop compensation method according to claim 7, wherein the first voltage detecting step comprises:

a line voltage detecting step to detect three-phase line voltages to be input to the power converter and to output three-phase line voltage signals; and a line-to-line phase voltage converting step to convert the detected three-phase line voltage signals to three phase voltage signals.

12. A computer readable medium storing a program for making a computer perform steps comprising:

a first voltage detecting step to detect three-phase voltages to be input to a power converter and to output three-phase voltage signals, the converter converting three-phase alternating current to direct current, based on control pulse signals;

a first three-phase to two-phase converting step to convert the detected three-phase voltage signals to two-phase voltage signals;

a first current detecting step to detect three-phase currents to be input to the power converter and to output three-phase current signals;

a second three-phase to two-phase converting step to convert the detected three-phase current signals to two-phase current signals;

a first subtracting step to generate a first deviation signal from input current command signals and the two-phase current signals;

an input current controlling step to generate input current control signals based on the first deviation signal;

a first adding step to add the two-phase voltage signals to the input current control signals;

a first two-phase to three-phase converting step to convert input current control signals, to which the two-phase voltage signals have been added, to three-phase control signals;

a control pulse signal generating step to generate the control pulse signals for the power converter based on the three-phase control signals and to output the control pulse signals to the power converter;

a positive-phase negative-phase separating step to separate the converted two-phase voltage signals into positive-phase components and negative-phase components;

a second two-phase to three-phase converting step to convert the separated negative-phase components of the two-phase voltage signals to negative-phase components of the three-phase voltage signals;

a zero-phase voltage extracting step to extract a zero-phase voltage signal from the detected three-phase voltage signals; and a second adding step to add the negative-phase components of the three-phase voltage signals and the zero-phase voltage signal to the three-phase control signals, wherein in the first adding step, the separated positive-phase components of the two-phase voltage signals are added to the input current control signals, and in the control pulse signal generating step, the control pulse signals are generated based on three-phase control signals resulted from the sum of the negative-phase components of the three-phase voltage signals and the zero-phase voltage signal.

13. The computer readable medium according to claim 12, wherein the program further makes the computer perform steps comprising:

a second voltage detecting step to detect a DC voltage output from the power converter and to output a DC voltage signal;

a second subtracting step to generate a second deviation signal from a voltage commanding value signal and the DC voltage signal;

a DC voltage controlling step to generate a DC voltage control signal based on the second deviation signal; and an input current command converting step to generate the input current command signals based on the DC voltage control signal and the positive-phase components of the two-phase voltage signals.

14. The computer readable medium according to claim 13, wherein the program further makes the computer perform steps comprising:

a second current detecting step to detect a DC current output from the power converter and to output a DC current signal;

a multiplying step to multiply the DC voltage signal by the DC current signal and to output a DC power signal; and a third adding step to add the DC power signal to the DC voltage control signal, wherein in the input current command converting step, the input current command signals are generated based on DC voltage control signal to which the DC power signal has been added, and the positive-phase components of the two-phase voltage signals.

15. The computer readable medium according to claim 12, wherein the program further makes the computer perform steps comprising:

a phase voltage extracting step to extract a phase voltage signal from the three-phase voltage signals; and a synchronous signal generating step to generate and output a synchronous signal from the extracted phase voltage signal, wherein the first three-phase to two-phase converting step, the second three-phase to two-phase converting step, the first two-phase to three-phase converting step and the second two-phase to three-phase converting step are performed in synchronism with the synchronous signal.

16. The computer readable medium according to claim 12, wherein the first voltage detecting step comprises:

a line voltage detecting step to detect three-phase line voltages to be input to the power converter and to output three-phase line voltage signals; and a line-to-line phase voltage converting step to convert the detected three-phase line voltage signals to three phase voltage signals.

* * * * *